(12) United States Patent
Tang

(10) Patent No.: US 10,031,373 B2
(45) Date of Patent: Jul. 24, 2018

(54) LIQUID CRYSTAL DISPLAY PANEL

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventor: Yuejun Tang, Guangdong (CN)

(73) Assignees: Shenzhen China Star Optoelectronics Technology Co., Ltd., Shenzhen, Guangdong (CN); Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 49 days.

(21) Appl. No.: 14/778,290

(22) PCT Filed: Apr. 1, 2015

(86) PCT No.: PCT/CN2015/075656
§ 371 (c)(1),
(2) Date: Dec. 6, 2016

(87) PCT Pub. No.: WO2016/145681
PCT Pub. Date: Sep. 22, 2016

(65) Prior Publication Data
US 2018/0120603 A1   May 3, 2018

(30) Foreign Application Priority Data
Mar. 17, 2015  (CN) .......................... 2015 1 0118156

(51) Int. Cl.
*G02F 1/1339* (2006.01)
*G02F 1/1333* (2006.01)
*G02F 1/1343* (2006.01)

(52) U.S. Cl.
CPC .......... *G02F 1/1339* (2013.01); *G02F 1/1343* (2013.01); *G02F 1/133345* (2013.01)

(58) Field of Classification Search
None
See application file for complete search history.

(56) References Cited

U.S. PATENT DOCUMENTS

2007/0262961 A1   11/2007   Rho
2012/0062812 A1   3/2012    Wu

FOREIGN PATENT DOCUMENTS

CN   101546076   9/2009
CN   101644841   2/2010
(Continued)

OTHER PUBLICATIONS

Search Report and Written Opinion, dated Nov. 26, 2015, International Application No. PCT/CN2015/075656.
(Continued)

*Primary Examiner* — Richard Kim
(74) *Attorney, Agent, or Firm* — Kim Winston LLP

(57) ABSTRACT

A liquid crystal display panel is disclosed. The liquid crystal display panel comprises a first baseplate; a second baseplate, arranged at a position opposite to the first baseplate and being provided with a pixel electrode and a common electrode thereon; and an auxiliary spacer, arranged between the first baseplate and the second baseplate and fixed on the first baseplate, wherein the auxiliary spacer is provided with a top electrode, and the second baseplate is provided with an extending electrode of the common electrode and an extending electrode of the pixel electrode at a position corresponding to the top electrode, so that the top electrode touches the extending electrode of the common electrode and the extending electrode of the pixel electrode and enables the
(Continued)

common electrode and the pixel electrode to be connected with each other when the panel is pressed.

20 Claims, 3 Drawing Sheets

(56) References Cited

FOREIGN PATENT DOCUMENTS

| | | |
|---|---|---|
| CN | 101893776 | 11/2010 |
| CN | 201754208 | 3/2011 |
| CN | 102012574 | 4/2011 |
| CN | 103226268 | 7/2013 |
| CN | 103353693 | 10/2013 |

OTHER PUBLICATIONS

Office Action and Search Report dated, Apr. 12, 2017, for Chinese Patent Application No. 201510118156.4.

LIQUID CRYSTAL DISPLAY PANEL

CROSS REFERENCE TO RELATED APPLICATION

The present application claims benefit of Chinese patent application CN 201510118156.4, entitled "Liquid Crystal Display Panel" and filed on Mar. 17, 2015, the entirety of which is incorporated herein by reference.

FIELD OF THE INVENTION

The present disclosure relates to the technical field of liquid crystal display, and particularly to a liquid crystal display panel in which the light flux thereof can be controlled by the rotation of the liquid crystal molecules in a plane parallel to the substrate.

BACKGROUND OF THE INVENTION

Compared with the traditional display device, the liquid crystal display device has the advantages of a light and thin structure, low power consumption, low radiation, and so on. Therefore, the liquid crystal display device is widely used in various fields such as computer, mobile phone, car screen, etc. With the wide application of liquid crystal display device, the requirement for the performance of the liquid crystal display device is becoming increasingly high.

The Fringe-Field Switching (FFS) liquid crystal display panel and the In-Plane Switching (IPS) liquid crystal display panel have been widely used in the products of daily life and production. Since in the IPS liquid crystal display panel and the FFS liquid crystal display panel, the light flux is controlled by the rotation of the liquid crystal molecules in a plane parallel to the display panel, the two kinds of liquid crystal display panels have the advantages of wide viewing angles and high fidelity of the colors. However, when a finger slides on or presses the FFS and the IPS liquid crystal display panels, the disclination lines of the panels would be enlarged with the sliding of the finger. The originally lying liquid crystal molecules would stand up or fall into a chaos state with the sliding of the finger. In this case, the trace mura phenomenon would occur if the liquid crystal molecules cannot be recovered quickly to the lying state or the orientation state before pressing. The display quality of the liquid crystal display panel would be largely affected by the trace mura phenomenon.

Therefore, how to eliminate the trace mura phenomenon of the liquid crystal display panel and improve the display performance thereof is an important research direction in the industry.

SUMMARY OF THE INVENTION

In order to solve the aforesaid technical problem, the present disclosure provides a liquid crystal display panel, whereby the trace mura phenomenon thereof can be eliminated.

According to an embodiment, the present disclosure provides a liquid crystal display panel, comprising: a first baseplate; a second baseplate, arranged at a position opposite to the first baseplate and being provided with a pixel electrode and a common electrode thereon; and an auxiliary spacer, arranged between the first baseplate and the second baseplate and fixed on the first baseplate, wherein the auxiliary spacer is provided with a top electrode, and the second baseplate is provided with an extending electrode of the common electrode and an extending electrode of the pixel electrode at a position corresponding to the top electrode, so that the top electrode touches the extending electrode of the common electrode and the extending electrode of the pixel electrode and enables the common electrode and the pixel electrode to be connected with each other when the panel is pressed and a distance between the first baseplate and the second baseplate gets smaller.

According to an embodiment of the present disclosure, the auxiliary spacer is arranged at each pixel of the first baseplate.

According to an embodiment of the present disclosure, the top electrode has a block structure and is fixed at a top of the auxiliary spacer.

According to an embodiment of the present disclosure, a top surface of the extending electrode of the common electrode and a top surface of the extending electrode of the pixel electrode are in a same plane.

According to an embodiment of the present disclosure, the extending electrode of the common electrode and the extending electrode of the pixel electrode are both comb electrodes, and form an interdigital shape.

According to an embodiment of the present disclosure, the panel further comprises a main spacer, wherein the main spacer is arranged between the first baseplate and the second baseplate and is fixed on the first baseplate; and wherein a height of the main spacer is larger than a sum of a height of the auxiliary spacer and a height of the top electrode.

According to an embodiment of the present disclosure, the top electrode is a conductive film.

According to an embodiment of the present disclosure, the top electrode is a conductive metal.

According to an embodiment of the present disclosure, the pixel electrode is arranged above the common electrode, and an insulation layer is arranged between the pixel electrode and the common electrode.

According to an embodiment of the present disclosure, the common electrode is arranged above the pixel electrode, and an insulation layer is arranged between the pixel electrode and the common electrode.

The following beneficial effects can be brought about according to the present disclosure. In particular, the top electrode is arranged on the auxiliary spacer, so that the pixel electrode and the common electrode can be connected with each other through the top electrode, and thus a voltage difference between the pixel electrode and the common electrode can be eliminated when the liquid crystal display panel is pressed. In this case, the liquid crystal molecules can be recovered quickly to the lying state or the orientation state before pressing since there is no electric field force applied thereon, and thus the trace mura phenomenon of the liquid crystal display panel can be alleviated.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The accompanying drawings provide further understandings of the present disclosure and constitute one part of the description. The drawings are used for interpreting the present disclosure together with the embodiments, not for limiting the present disclosure. In the drawings.

DETAILED DESCRIPTION OF THE EMBODIMENTS

Figure 1:
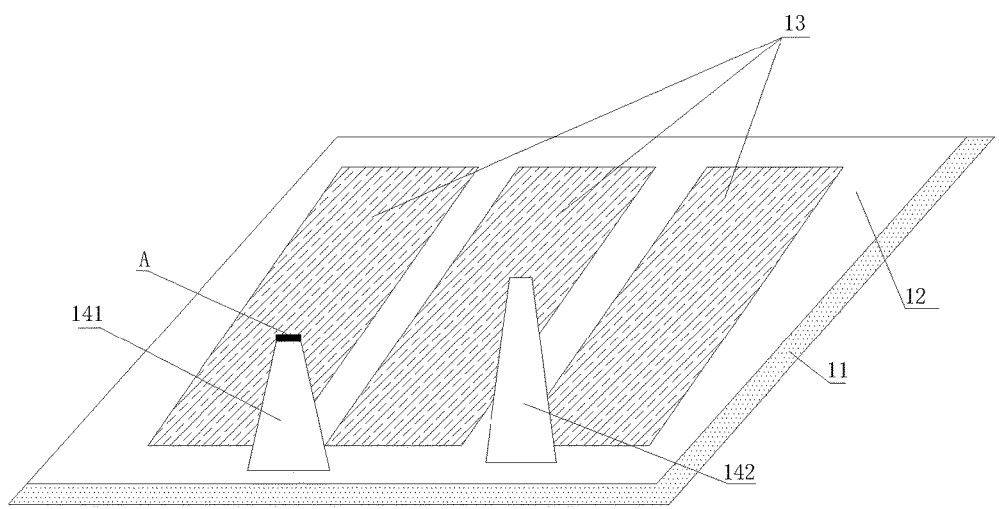
FIG. 1 schematically shows structures of an auxiliary spacer and a main spacer of a first baseplate according to an embodiment of the present disclosure.

The present disclosure will be illustrated in detail hereinafter in combination with the accompanying drawings to make the purpose, technical solutions, and advantages of the present disclosure more clear.

In the IPS and the FFS technologies, the liquid crystal molecules are rotated in a plane parallel to a substrate, thereby controlling the brightness of a liquid crystal panel. The electric field which enables the liquid crystal molecules to be rotated is generated by a pixel electrode and a common electrode that are arranged on the same substrate.

The pixel electrode and the common electrode can generate a horizontal electric field in a space between the two substrates where the liquid crystal molecules are disposed, and the liquid crystal molecules can rotate in a plane parallel to the substrates under the action of the horizontal electric field. The strength of the horizontal electric field generated by the pixel electrode and the common electrode can be controlled through controlling a voltage therebetween, the rotation angle of the liquid crystal molecules can be controlled through controlling the strength of the horizontal electric field, and the light flux of the liquid crystal panel can be controlled through controlling the rotation angle of the liquid crystal molecules.

The IPS and the FFS liquid crystal panels can be made of positive liquid crystal material, wherein a major axis of the liquid crystal molecules is parallel to the liquid crystal panel. The major axis of the liquid crystal molecules is parallel to the electric filed lines when an external horizontal electric field is applied.

When a finger slides on or presses the IPS and the FFS liquid crystal display panels which are made of positive liquid crystal material, the liquid crystal molecules of the panels would stand up or fall into a chaos state, and the area which falls into the chaos state would be enlarged, i.e., the disclination line area would be enlarged. The pixel electrode and the common electrode are mainly used for forming the horizontal electric field, but the direction of the electric field at corners of the pixel electrode and corners of the common electrode is complex. The electric field at the corners of the pixel electrode and the corners of the common electrode comprises a horizontal component and a vertical component, wherein the liquid crystal molecules would have a large pre-tilt angle under the action of the vertical component. When the slide or press stops, the liquid crystal molecules cannot be recovered quickly to the lying state or the orientation state before pressing due to the existence of the vertical component. In addition, the rotation of the liquid crystal molecules at these positions is complex and is difficult to be controlled under the combined action of the horizontal electric field and the vertical electric field thereof. Consequently, the display quality of the liquid crystal display panel would be affected.

At present, the methods for alleviating the trace mura phenomenon of the liquid crystal display panel include reducing a driving voltage of the liquid crystal molecules, optimizing a pixel design thereof, selecting liquid crystals with a high response speed, and black frame inserting. However, when the trace mura phenomenon of the display panel is alleviated through reducing the driving voltage of the liquid crystal molecules, the time during which the liquid crystal molecules rotate to the required angle would be prolonged since the driving voltage of the liquid crystal molecules is reduced. When the trace mura phenomenon of the display panel is alleviated through optimizing the pixel design of the display panel, the driving voltage of the liquid crystal molecules should be reduced at the same time. When the trace mura phenomenon of the display panel is alleviated through selecting liquid crystal with a high response speed, the alleviation extent thereof is limited. When the trace mura phenomenon of the display panel is alleviated through black frame inserting, it can only be realized with the cooperation of the software and the hardware of the liquid crystal panel.

The present disclosure provides a liquid crystal display panel in which the standing or in the chaos state liquid crystal molecules can be recovered to the lying state in a simple, convenient, and timely manner.

The liquid crystal display panel comprises a first baseplate, a second baseplate, an auxiliary spacer, a pixel electrode and a common electrode. The second baseplate is arranged at a position opposite to the first baseplate, and is provided with the pixel electrode and the common electrode. The auxiliary spacer is arranged between the first baseplate and the second baseplate, and is fixed on the first baseplate.

The auxiliary spacer is provided with a top electrode, and the second baseplate is provided with an extending electrode of the common electrode and an extending electrode of the pixel electrode at a position corresponding to the top electrode. When the panel is pressed, a distance between the first baseplate and the second baseplate gets smaller, and the originally lying liquid crystal molecules of the panel would stand up, so that the top electrode can touch the extending electrode of the pixel electrode and the extending electrode of the common electrode. The top electrode is conductive, and thus the common electrode and the pixel electrode can be electrically connected with each other. In this case, a voltage difference between the common electrode and the pixel electrode can be eliminated, so that the standing or in-the-chaos-state liquid crystal molecules can be recovered quickly to the lying state since there is not a vertical electric field.

According to an embodiment of the present disclosure, the top electrode has a block structure and is fixed at a top of the auxiliary spacer. As shown in FIG. 1, a glass substrate 11 is provided with a black matrix layer 12 and a color film layer 13, and the black matrix layer 12 is provided with an auxiliary spacer 141. The glass substrate 11, the black matrix layer 12, and the color film layer 13 constitute the first baseplate. A block-shaped electrode A (i.e., a top electrode) is fixed on a top of the auxiliary spacer 141, and the block-shaped electrode A is conductive. Of course, the top electrode is not limited by the block structure, and a conductive electrode with other shapes or structures can serve as the top electrode here. The auxiliary spacer 141 is arranged on the black matrix layer 12 of the first baseplate, so that the nonopaque color film layer 13 can be avoided to be occupied, and an aperture ratio of the liquid crystal display panel can be improved. The auxiliary spacer 141 can also be arranged at other positions of the pixel.

According to an embodiment of the present disclosure, the block-shaped electrode can be a conductive film, for example, an Indium Tin Oxide (ITO) film. According to an embodiment of the present disclosure, the block-shaped electrode can be a conductive metal, such as Al, Mo, and so on. However, the block-shaped electrode is not limited by the aforesaid conductive film or conductive metal.

Figure 4:
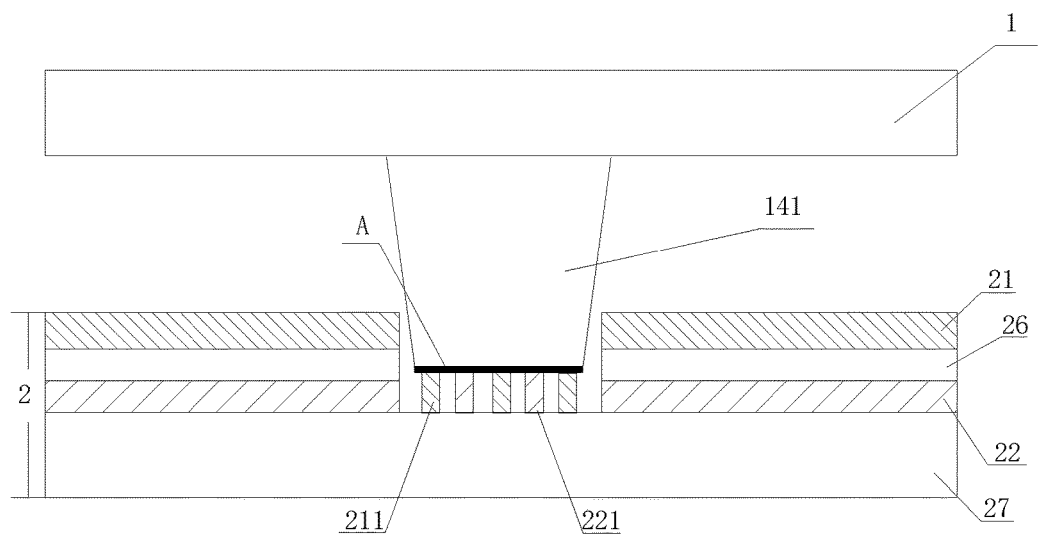
FIG. 4 schematically shows a working principle of a top electrode that is arranged on the auxiliary spacer according to an embodiment of the present disclosure.

Since the common electrode and the pixel electrode are formed on the same baseplate, in order to enable that the common electrode and the pixel electrode are insulated from each other, an insulation layer should be arranged therebetween. As shown in FIG. 4, a substrate 27 is provided with a common electrode 22, and an insulation layer 26 is arranged between a pixel electrode 21 and the common electrode 22. The substrate 27, the common electrode 22, the insulation layer 26, and the pixel electrode 21 constitute a second baseplate 2. The common electrode 22 and the pixel electrode 21 each are provided with a corresponding extending electrode used for contacting the top electrode so that the top electrode A can touch the pixel electrode 21 and the common electrode 22 when the display panel is pressed.

According to an embodiment of the present disclosure, a top surface of an extending electrode 221 of the common electrode and a top surface of an extending electrode 211 of the pixel electrode are arranged in a same plane, so that the top electrode A can touch the extending electrode 221 of the common electrode and the extending electrode 211 of the pixel electrode at the same time. Since the insulation layer 26 is arranged between the pixel electrode 21 and the common electrode 22, the insulation layer in an area of the extending electrode of the common electrode and an area of the extending electrode of the pixel electrode should be etched away. In this case, the extending electrode 221 of the common electrode and the extending electrode 211 of the pixel electrode can be formed in a same plane, and the top surfaces of the two extending electrodes are in the same plane, so that the top electrode A can touch the two extending electrodes at the same time, as shown in FIG. 4. Moreover, in order to realize that the common electrode and the pixel electrode can be connected with each other through the top electrode when a finger slides on or presses any position of the liquid crystal display panel, according to an embodiment of the present disclosure, the liquid crystal panel is provided with the auxiliary spacer with the top electrode at each pixel thereof. Therefore, the liquid crystal molecules in each pixel can all be controlled.

Figure 2:
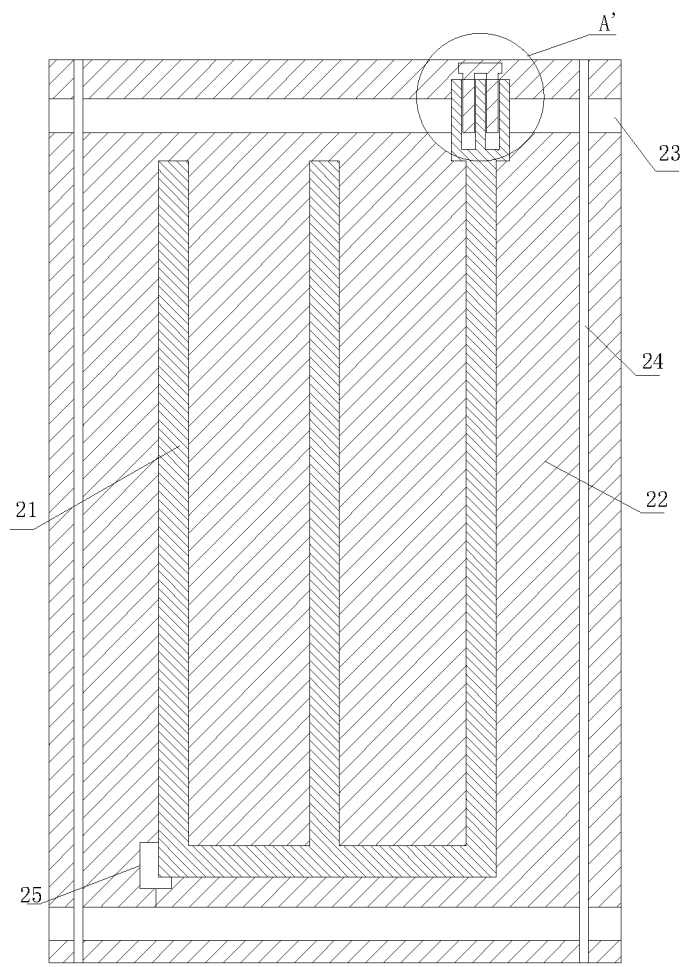
FIG. 2 schematically shows structures of a pixel electrode and a corresponding extending electrode, as well as a common electrode and a corresponding extending electrode of a second baseplate according to an embodiment of the present disclosure.

According to an embodiment of the present disclosure, the extending electrode of the common electrode and the extending electrode of the pixel electrode are both densely-distributed comb electrodes, and the extending electrode of the common electrode and the extending electrode of the pixel electrode form an interdigital shape. As shown in FIG. 2, the second baseplate is provided with the comb-shaped pixel electrode 21 and the planar common electrode 22, and the insulation layer (not shown in FIG. 2) is provided between the pixel electrode 21 and the common electrode 22. The second baseplate is further provided with a gate line 23, a data line 24, and a Thin Film Transistor (TFT) switch 25. At the same time, an area A' of the comb-shaped extending electrodes is arranged on the second baseplate at a position corresponding to the block-shaped electrode A.

Figure 3:
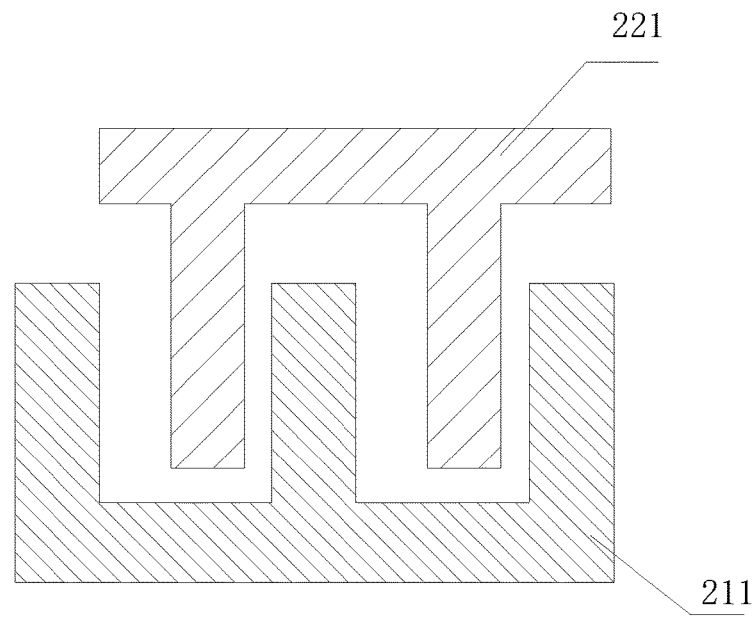
FIG. 3 is an enlarged diagram of the extending electrode of the common electrode and the extending electrode of the pixel electrode as shown in FIG. 2.

FIG. 3 shows an enlarged diagram of the area A' of the comb-shaped extending electrodes as shown in FIG. 2. As shown in FIG. 3, the comb-shaped extending electrode 221 of the common electrode 22 and the comb-shaped extending electrode 211 of the pixel electrode 21 form an interdigital shape, and there are certain distances among the comb teeth so as to prevent the contact of the comb teeth thereof and avoid electric field interference therebetween. In this case, a horizontal electric field can be generated between the extending electrode of the common electrode 22 and the extending electrode of the pixel electrode 21, and thus a disordered electric field in other directions by which the rotation of the liquid crystal molecules would otherwise be affected can be avoided. Of course, the extending electrode 221 of the common electrode and the extending electrode 211 of the pixel electrode are not limited by the aforesaid comb-shaped interdigital structure.

None of a surface of the top electrode A, a surface of the extending electrode 221 of the common electrode, or a surface of the extending electrode 211 of the pixel electrode is provided with an oriented material, so that the top electrode A can touch the extending electrode 221 of the common electrode and the extending electrode 211 of the pixel electrode easily. The oriented material is used for forming an oriented layer, by which the liquid crystal molecules can be oriented. There is an affinity between the oriented material and the liquid crystal molecules. In order to avoid the influences of the oriented material on the rotation of the liquid crystal molecules and on the conductive performance between the block-shaped electrode A and the extending electrodes, the oriented material on the contact surfaces of the block-shaped electrode A and the extending electrodes should be removed.

According to an embodiment of the present disclosure, a main spacer 142 is further arranged between the first baseplate and the second baseplate of the display panel. The main spacer 142 is fixed on the first baseplate, so that the thickness of the liquid crystal cell and the uniformity thereof can be ensured. That is, a distance between the first baseplate and the second baseplate can be maintained, as shown in FIG. 1. The main spacer 142 is arranged on the black matrix layer 12 of each pixel of the first baseplate, so that the nonopaque color film layer 13 can be avoided to be occupied, and the aperture ratio of the liquid crystal display panel can be improved. Of course, the main spacer 142 can also be arranged at other positions of the pixel.

A height of the main spacer 142 is larger than a sum of a height of the auxiliary spacer 141 and a height of the top electrode A, so that the top electrode A cannot touch the extending electrodes and the liquid crystal panel can work normally due to the existence of the main spacer 142 when the liquid crystal panel is not pressed. When the liquid crystal panel is pressed, the main spacer 142 is also pressed, the distance between the first baseplate and the second baseplate gets smaller, and the common electrode 22 and the pixel electrode 21 can be electrically connected with each other by the block-shaped electrode A. In this case, since there is not a voltage difference, a relatively strong vertical electric field or other disordered electric field between the pixel electrode 21 and the common electrode 22, the standing or in the chaos state liquid crystal molecules after the pressing of the finger can be recovered quickly to the lying state under the actions of the anchoring energy and the elastic restoring force. When the finger moves from the panel, the block-shaped electrode A cannot touch the extending electrode 221 of the common electrode and the extending electrode 211 of the pixel electrode any more since the supporting action of the main spacer 142. The pixels can be supplied with signals normally to display images, so that the liquid crystal molecules can be recovered to the orientation state before pressing.

FIG. 4 schematically shows a working principle based on which the pixel electrode 21 and the common electrode 22 can be electrically connected with each other by the top electrode A and the extending electrodes according to an embodiment of the present disclosure. As shown in FIG. 4, when the liquid crystal panel is pressed, the block-shaped electrode A of the auxiliary spacer 141 of the first baseplate 1 can touch the extending electrode 221 of the common electrode and the extending electrode 211 of the pixel electrode, so that the pixel electrode 21 and the common electrode 22 can be electrically connected with each other and the voltage difference therebetween can be eliminated. There is not an electric field between the first baseplate 1 and the second baseplate 2 since the voltage difference is not exist between the pixel electrode 21 and the common electrode 22, so that the standing or in the chaos state liquid crystal molecules after the pressing of the finger can be recovered quickly to the lying state under the actions of the anchoring energy and the elastic restoring force.

Since in the IPS and the FFS liquid crystal display panels, the pixel electrode and the common electrode are arranged on the same baseplate and are overlapped with each other in vertical direction, there are two arrangement modes of the pixel electrode and the common electrode. According to an embodiment of the present disclosure, the pixel electrode is arranged at the top of the second baseplate, and the common electrode is arranged at the bottom of the second baseplate. The insulation layer is arranged between the pixel electrode and the common electrode, so that the pixel electrode and the common electrode can be insulated from each other, as shown in FIG. 4.

According to another embodiment of the present disclosure, the common electrode is arranged at the top of the second baseplate, and the pixel electrode is arranged at the bottom of the second baseplate. The insulation layer is arranged between the pixel electrode and the common electrode so that the pixel electrode and the common electrode can be insulated from each other. In the liquid crystal panels of the two structures, the auxiliary spacer can be provided with the top electrode, so that the standing or in the chaos state liquid crystal molecules after pressing can be recovered to the lying state.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. A liquid crystal display panel, comprising:
a first baseplate;
a second baseplate, arranged at a position opposite to the first baseplate and being provided with a pixel electrode and a common electrode thereon; and
an auxiliary spacer, arranged between the first baseplate and the second baseplate and fixed on the first baseplate,
wherein the auxiliary spacer is provided with a top electrode, and the second baseplate is provided with an extending electrode of the common electrode and an extending electrode of the pixel electrode at a position corresponding to the top electrode, so that the top electrode touches the extending electrode of the common electrode and the extending electrode of the pixel electrode and enables the common electrode and the pixel electrode to be connected with each other when the panel is pressed and a distance between the first baseplate and the second baseplate gets smaller.

2. The panel according to claim 1, wherein the auxiliary spacer is arranged at each pixel of the first baseplate.

3. The panel according to claim 2, wherein the pixel electrode is arranged above the common electrode, and an insulation layer is arranged between the pixel electrode and the common electrode.

4. The panel according to claim 2, wherein the common electrode is arranged above the pixel electrode, and an insulation layer is arranged between the pixel electrode and the common electrode.

5. The panel according to claim 1, wherein the top electrode has a block structure and is fixed at a top of the auxiliary spacer.

6. The panel according to claim 5, wherein the pixel electrode is arranged above the common electrode, and an insulation layer is arranged between the pixel electrode and the common electrode.

7. The panel according to claim 5, wherein the common electrode is arranged above the pixel electrode, and an insulation layer is arranged between the pixel electrode and the common electrode.

8. The panel according to claim 1, wherein a top surface of the extending electrode of the common electrode and a top surface of the extending electrode of the pixel electrode are in a same plane.

9. The panel according to claim 8, wherein the extending electrode of the common electrode and the extending electrode of the pixel electrode are both comb electrodes, and form an interdigital shape.

10. The panel according to claim 9, wherein the pixel electrode is arranged above the common electrode, and an insulation layer is arranged between the pixel electrode and the common electrode.

11. The panel according to claim 9, wherein the common electrode is arranged above the pixel electrode, and an insulation layer is arranged between the pixel electrode and the common electrode.

12. The panel according to claim 8, wherein the pixel electrode is arranged above the common electrode, and an insulation layer is arranged between the pixel electrode and the common electrode.

13. The panel according to claim 8, wherein the common electrode is arranged above the pixel electrode, and an insulation layer is arranged between the pixel electrode and the common electrode.

14. The panel according to claim 1, further comprising a main spacer,
wherein the main spacer is arranged between the first baseplate and the second baseplate and is fixed on the first baseplate; and
wherein a height of the main spacer is larger than a sum of a height of the auxiliary spacer and a height of the top electrode.

15. The panel according to claim 14, wherein the pixel electrode is arranged above the common electrode, and an insulation layer is arranged between the pixel electrode and the common electrode.

16. The panel according to claim 14, wherein the common electrode is arranged above the pixel electrode, and an insulation layer is arranged between the pixel electrode and the common electrode.

17. The panel according to claim 1, wherein the top electrode is a conductive film.

18. The panel according to claim 1, wherein the top electrode is a conductive metal.

19. The panel according to claim 1, wherein the pixel electrode is arranged above the common electrode, and an insulation layer is arranged between the pixel electrode and the common electrode.

20. The panel according to claim 1, wherein the common electrode is arranged above the pixel electrode, and an insulation layer is arranged between the pixel electrode and the common electrode.

* * * * *